United States Patent
Liu et al.

(10) Patent No.: US 12,414,097 B2
(45) Date of Patent: Sep. 9, 2025

(54) METHODS AND APPARATUS FOR DYNAMIC FDM BETWEEN PARENT LINK AND CHILD LINK IN IAB NETWORK

(71) Applicant: Lenovo (Beijing) Ltd., Beijing (CN)

(72) Inventors: Hongmei Liu, Changping District (CN); Lianhai Wu, Chaoyang (CN); Zhi Yan, Xicheng District (CN); Yuantao Zhang, Dongcheng District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 447 days.

(21) Appl. No.: 17/920,782

(22) PCT Filed: Apr. 24, 2020

(86) PCT No.: PCT/CN2020/086657
§ 371 (c)(1),
(2) Date: Oct. 22, 2022

(87) PCT Pub. No.: WO2021/212461
PCT Pub. Date: Oct. 28, 2021

(65) Prior Publication Data
US 2023/0156682 A1    May 18, 2023

(51) Int. Cl.
*H04W 72/23* (2023.01)
*H04W 72/0453* (2023.01)
*H04W 72/27* (2023.01)

(52) U.S. Cl.
CPC ....... *H04W 72/0453* (2013.01); *H04W 72/23* (2023.01); *H04W 72/27* (2023.01)

(58) Field of Classification Search
CPC ........................ H04L 5/0094; H04W 72/0453; H04W 72/23; H04W 72/27; H04W 92/12
(Continued)

(56) References Cited

U.S. PATENT DOCUMENTS

2020/0107345 A1    4/2020  Ang et al.
2020/0229181 A1*   7/2020  Qi ................... H04W 72/0446
(Continued)

FOREIGN PATENT DOCUMENTS

CN     110536350 A    12/2019
CN     110691416 A    1/2020
(Continued)

OTHER PUBLICATIONS

Ericsson, "Updated summary of 7.2.3.1 Enhancements to support NR backhaul links", 3GPP TSG RAN WG1 Meeting #94bis, R1-1811899, Chengdu, China [retrieved Oct. 25, 2022]. Retrieved from the Internet <https://www.3gpp.org/ftp/tsg_ran/WG1_RL1/TSGR1_94b/Docs?sortby=daterev>., Oct. 2018, 19 Pages.
(Continued)

*Primary Examiner* — Robert J Lopata
(74) *Attorney, Agent, or Firm* — FIG. 1 Patents

(57) ABSTRACT

Embodiments of the present disclosure relate to methods and apparatus for dynamic FDM between a parent link and a child link in an IAB network. According to an embodiment of the present disclosure, a method includes: receiving indication information from a parent node of an IAB node, wherein the indication information indicates at least one frequency domain resource of an operating band associated with one of a parent link between the IAB node and the parent node and a child link between the IAB node and a child node of the IAB node; and determining a set of frequency domain resources for the child link from the operating band at least based on the indication information.

20 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2021/0037531 A1* | 2/2021 | Abedini | H04W 72/046 |
| 2021/0127389 A1 | 4/2021 | Liu et al. | |
| 2021/0289571 A1* | 9/2021 | Akl | H04W 76/15 |
| 2021/0315043 A1* | 10/2021 | Luo | H04W 72/27 |
| 2022/0182160 A1* | 6/2022 | Su | H04B 17/309 |
| 2022/0201767 A1* | 6/2022 | Wei | H04W 74/0866 |
| 2022/0225333 A1* | 7/2022 | Liu | H04W 72/23 |
| 2022/0361174 A1* | 11/2022 | Liu | H04L 27/2605 |

FOREIGN PATENT DOCUMENTS

| | | |
|---|---|---|
| CN | 110831095 A | 2/2020 |
| CN | 111972000 A | 11/2020 |
| WO | 2019185340 A1 | 10/2019 |
| WO | 2019242748 A1 | 12/2019 |
| WO | 2020064076 A1 | 4/2020 |

OTHER PUBLICATIONS

PCT/CN2020/086657, "International Preliminary Report on Patentability", PCT Application No. PCT/CN2020/086657, Nov. 3, 2022, 5 pages.

PCT/CN2020/086657, "International Search Report and Written Opinion", PCT Application No. PCT/CN2020/086657, Jan. 26, 2021, 6 pages.

20932412, "Extended European Search Report", EP Application No. 20932412, Dec. 19, 2023, 9 pages.

"Foreign Office Action", KR Application No. 10-2022-7036824, Mar. 6, 2025, 27 pages.

"Foreign Office Action", CN Application No. 202080100095.8, Feb. 22, 2025, 18 pages.

"NR; NR and NG-RAN Overall Description; Stage 2 (Release 16)", 3rd Generation Partnership Project; Technical Specification Group Radio Access Network; 3GPP TS 38.300 V16.1.0 (Mar. 2020), Mar. 2020, 129 pages.

Huawei, et al., "Resource multiplexing between backhaul and access in IAB", 3GPP TSG RAN WG1 Meeting #99, R1-1911856, Reno, USA, Nov. 18-22, 2019., Nov. 2019, 7 pages.

Intel Corporation, "Phy layer enhancements for NR IAB", 3GPP TSG RAN WG1 #94bis, R1-1810770, Oct. 8-Oct. 12, 2018, Chengdu, China., Oct. 2018, 13 pages.

Qualcomm Incorporated, "Resource Management in IAB Network", 3GPP TSG RAN WG1 Meeting #95, R1-1813419, Spokane, US, Nov. 12-16, 2018., Nov. 2018, 9 pages.

Sony, "IAB resource coordination and scheduling", 3GPP TSG RAN WG2 Meeting #106, R2-1907034, Reno, USA, May 13-17, 2019., May 2019, 3 pages.

ZTE, "Discussion on IAB node resource allocation", 3GPP TSG-RAN WG2 Meeting #102, R2-1807402, Busan, Korea, May 21-25, 2018., May 2018, 4 pages.

* cited by examiner

METHODS AND APPARATUS FOR DYNAMIC FDM BETWEEN PARENT LINK AND CHILD LINK IN IAB NETWORK

TECHNICAL FIELD

The present disclosure relates to wireless communications, and more particularly, to methods and apparatus for dynamic frequency division multiplexing (FDM) between a parent link and a child link in an integrated access and backhaul (IAB) network.

BACKGROUND

In the 3rd Generation Partnership Project (3GPP), deployment of relay nodes (RNs) in a wireless communication system is promoted. One objective for deploying RNs is to enhance coverage area of a base station (BS, also called eNB in 4G networks or gNB in 5G networks) by improving the throughput of a mobile device (also known as a user equipment (UE)) that locates in a coverage hole or far from the BS, which can result in relatively low signal quality.

In a wireless communication system which employs RNs, a BS that can provide connections to at least one RN is called a donor BS (or a donor node or a donor). An RN is connected to a donor BS by a backhaul link. The RN may hop through one or more RNs before reaching the donor BS, or may be directly connected to the donor BS. For the new radio (NR) communication networks, 3GPP is envisioning an IAB architecture for supporting multi-hop relays, wherein a donor node with multi-connectivity is also supported by an IAB node. That is, the IAB node has a plurality of active routes to the donor BS via multiple parent IAB nodes (also called "serving IAB nodes"). A multi-hop network may provide more range extension than a single-hop network. This is relatively more beneficial with respect to wireless communications at frequencies above 6 GHz, which have limited ranges when using single-hop backhaul(s). Multi-hop backhaul(s) further enables backhauls around obstacles, e.g., buildings in an urban environment for in-cluster deployments.

In an IAB system, an IAB node can be configured with an operation band for its parent link(s), i.e., the link(s) between the IAB node and its parent node(s), and an operation band for its child link(s), i.e., the link(s) between the IAB node and its child node(s). The operation band for each link may include at least one of an uplink operation band or a downlink operation band. Different operation bands can be configured for the parent link(s) and the child link(s) to mitigate or eliminate interference between the parent link(s) and the child link(s) and to enable band-level FDM between the parent link(s) and the child link(s). However, a link normally need not use the whole operation band. In NR, bandwidth part(s) (BWP(s)) of an operation band can be dynamically configured for a link to improve resource scheduling flexibility. It is possible to perform dynamic FDM between the parent link(s) and the child link(s) of an IAB node based on a BWP framework, thereby improving resource utilization efficiency in an IAB system.

SUMMARY OF THE DISCLOSURE

An object of the embodiments of the present disclosure is to provide methods and apparatuses for dynamic FDM between a parent link and a child link in an IAB network.

According to an embodiment of the present disclosure, a method may include: receiving indication information from a parent node of an IAB node, wherein the indication information indicates at least one frequency domain resource of an operating band associated with one of a parent link between the IAB node and the parent node and a child link between the IAB node and a child node of the IAB node; and determining a set of frequency domain resources for the child link from the operating band at least based on the indication information.

According to another embodiment of the present disclosure, an apparatus may include: at least one non-transitory computer-readable medium having stored thereon computer executable instructions; at least one receiving circuitry; at least one transmitting circuitry; and at least one processor coupled to the at least one non-transitory computer-readable medium, the at least one receiving circuitry and the at least one transmitting circuitry. The computer executable instructions may cause the at least one processor to implement a method according to any embodiment of the present disclosure, which will be described below.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only forms in which the present disclosure may be practiced. It is to be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G, 3GPP long term evolution (LTE) Release 8 and so on. Persons skilled in the art know very well that, with the development of network architecture and new service scenarios, the embodiments in the present disclosure are also applicable to similar technical problems; and moreover, the terminologies recited in the present disclosure may change, which should not affect the principle of the present disclosure.

Figure 1A:
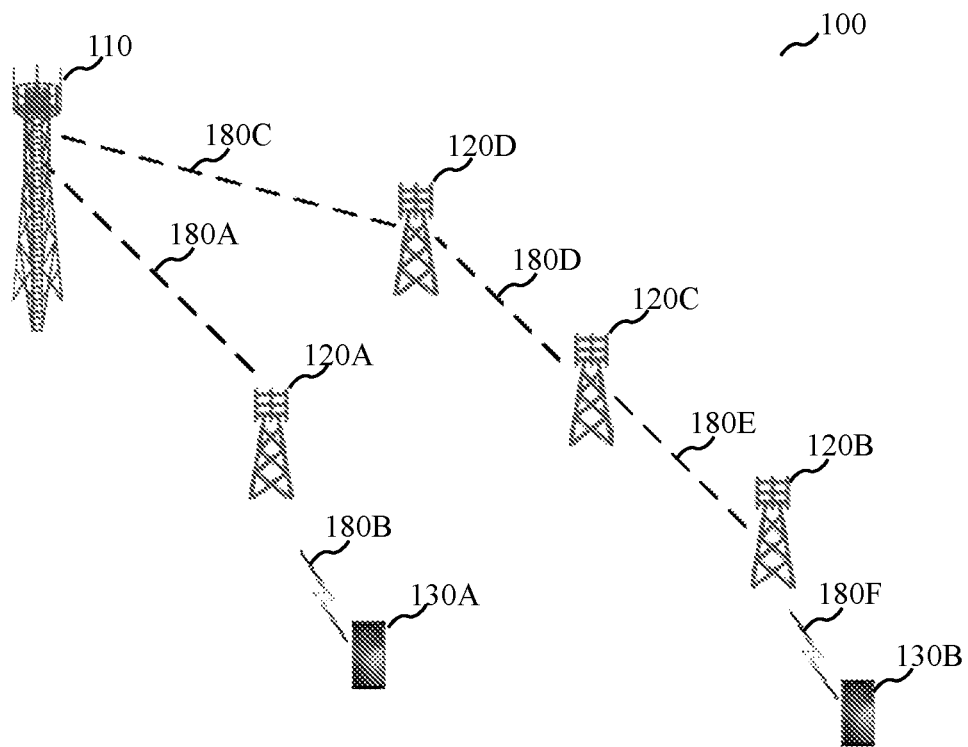
FIG. 1A illustrates an exemplary IAB system according to some embodiments of the present disclosure.

FIG. 1A illustrates an exemplary IAB system 100 according to some embodiments of the present disclosure.

Referring to FIG. 1A, the IAB system 100 can include an IAB donor node (e.g., donor node 110), some IAB nodes (e.g., IAB node 120A, IAB node 120B, IAB node 120C, and IAB node 120D), and some UEs (e.g., UE 130A and UE 130B). Although merely, for simplicity, one donor node is illustrated in FIG. 1A, it is contemplated that IAB system 100 may include more donor node(s) in some other embodiments of the present disclosure. Similarly, although merely four IAB nodes are illustrated in FIG. 1A for simplicity, it is contemplated that IAB system 100 may include more or fewer IAB nodes in some other embodiments of the present disclosure. Although merely two UEs are illustrated in FIG. 1A for simplicity, it is contemplated that IAB system 100 may include more or fewer UEs in some other embodiments of the present disclosure.

IAB node 120A is directly connected to donor node 110. IAB node 120D is directly connected to donor node 110. In this example, donor node 110 is a parent node of IAB node 120A, and also a parent node of IAB node 120D. IAB nodes 120A and 120D are child nodes of donor node 110. Link 180A between donor node 110 and IAB node 120A is a parent link of IAB node 120A. Link 180C between donor node 110 and IAB node 120D is a parent link of IAB node 120D. IAB node 120A can be connected to donor node(s) other than donor node 110 in accordance with some other embodiments of the present disclosure. IAB node 120D can be connected to donor node(s) other than donor node 110 in accordance with some other embodiments of the present disclosure.

IAB node 120C can reach donor node 110 by hopping through IAB node 120D. IAB node 120D is a parent node of IAB node 120C, and IAB node 120C is a child node of IAB node 120D. Link 180D between IAB node 120D and IAB node 120C is a child link of IAB node 120D, and also a parent link of IAB node 120C.

IAB node 120B can reach donor node 110 by hopping through IAB node 120C and IAB node 120D. IAB node 120C and IAB node 120D are upstream nodes of IAB node 120B, and IAB node 120C is a parent node of IAB node 120B. In other words, IAB node 120B is a child node of IAB node 120C. IAB node 120B and IAB node 120C are downstream nodes of IAB node 120D. Link 180E between IAB node 120C and IAB node 120B is a child link of IAB node 120C, and also a parent link of IAB node 120B.

UE 130A is directly connected to IAB node 120A via link 180B, and UE 130B is directly connected to IAB node 120B via link 180F. In other words, UE 130A and UE 130B are served by IAB node 120A and IAB node 120B, respectively. In some other embodiments of the present disclosure, UE 130A and UE 130B may also be referred to as child nodes of IAB node 120A and IAB node 120B, respectively. Link 180B is a child link of IAB node 120A. Link 180F is a child link of IAB node 120B.

Each of IAB node 120A, IAB node 120B, IAB node 120C, and IAB node 120D may be directly connected to one or more UEs in accordance with some other embodiments of the present disclosure.

Each of IAB node 120A, IAB node 120B, IAB node 120C, and IAB node 120D may be directly connected to one or more IAB nodes in accordance with some other embodiments of the present disclosure.

Figure 1B:
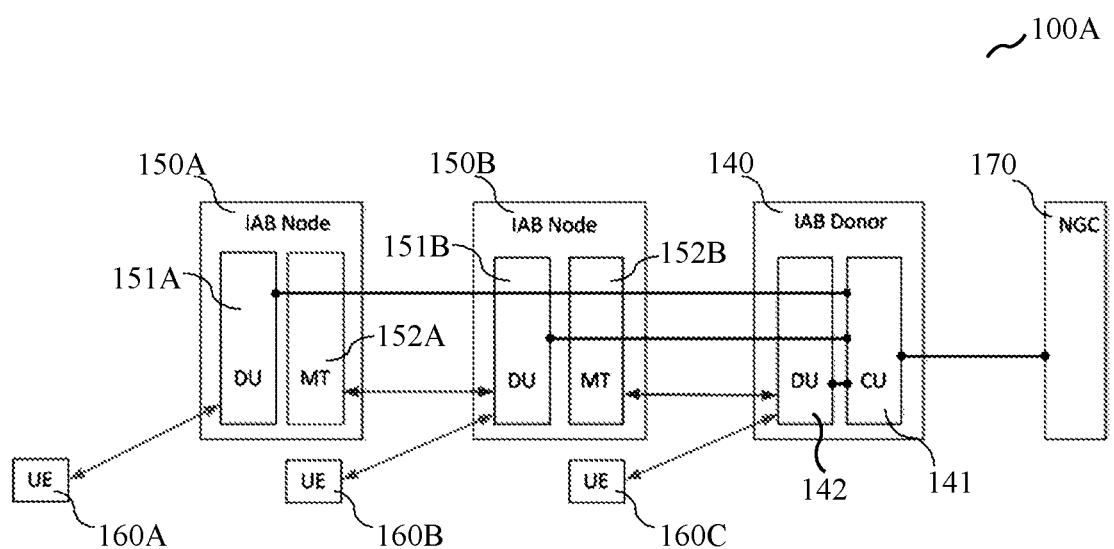
FIG. 1B illustrates an exemplary IAB system according to some other embodiments of the present disclosure.

FIG. 1B illustrates an exemplary IAB system 100A according to some embodiments of the present disclosure.

Referring to FIG. 1B, the IAB system 100A may include IAB donor 140, IAB node 150A, IAB node 150B, UE 160A, UE 160B, UE 160C and a Next-Generation Core (NGC) 170.

Each of the IAB node 150A and IAB node 150B may include a distributed unit (DU) and a mobile termination (MT). In the context of this disclosure, MT is referred to as a function resided in an IAB node that terminates the radio interface layers of the backhaul Uu interface toward an IAB donor or other IAB nodes. The IAB nodes may be connected to an upstream IAB node or a BS (e.g., an IAB donor) via the MT function. The IAB nodes may be connected to UEs or a downstream IAB node via the DU.

IAB node 150A may be connected to an upstream IAB node (e.g., IAB node 150B) via MT 152A. IAB node 150A may be connected to UE 160A via DU 151A.

IAB node 150B may be connected to an upstream IAB node or IAB donor 140 via MT 152B. IAB node 150B may be connected to UE 160B via DU 151B. IAB node 150B may be connected to a downstream IAB node (e.g., IAB node 150A) via DU 151B.

In some embodiments of the present disclosure, IAB nodes as shown in FIG. 1B may include Layer-2 (L2) IAB nodes.

Referring back to FIG. 1A, the IAB nodes (e.g., IAB node 120A, IAB node 120B, IAB node 120C, and IAB node 120D) may include L2 IAB nodes.

Referring to FIG. 1B, the BS (e.g., IAB donor 140) may include at least one DU to support UEs and MTs of downstream IAB nodes. A centralized unit (CU) 141 included in the IAB donor 140 controls the DUs of all IAB nodes (e.g., IAB node 150A and IAB node 150B) and the DU(s) (e.g., DU 142) resided in the IAB donor 140. The DU(s) and the CU of an IAB donor may be co-located or may be located in different positions. The DU(s) and the CU of the IAB donor are connected via F1 interface. In other words, the F1 interface provides means for interconnecting the CU and the DU(s) of an IAB donor. The F1 Application Protocol (F1AP) supports the functions of F1 interface by certain F1AP signaling procedures.

In some embodiments of the present disclosure, CU 141 of the IAB donor 140 is a logical node hosting Radio Resource Control (RRC), Service Data Adaptation Protocol (SDAP) and Packet Data Convergence Protocol (PDCP) layers of the BS. The DU of the BS is a logical node hosting Radio Link Control (RLC) layer, Medium Access Control (MAC) layer and Physical layer (PHY) of the BS. One cell is supported by only one DU of a BS or one DU of an IAB node.

According to NR Release 15 specifications, a parent node (e.g., IAB node 120D in FIG. 1) of an IAB node (e.g., IAB node 120C in FIG. 1) may dynamically configure a set of frequency domain resources for a link (e.g., link 180D in FIG. 1) between the parent node and the IAB node, i.e., a parent link of the IAB node, via downlink control information (DCI) signaling (e.g., signaling for a downlink assignment or uplink grant) to the IAB node, such that the IAB node can select frequency domain resource(s) from the configured set of frequency domain resources to perform at least one of uplink transmission and downlink reception on the parent link. The configured set of frequency domain resources is selected from an operation band of the IAB node, and may correspond to one or more BWPs within the operation band. For example, the DCI signaling from the parent node may include one or more BWP indexes corresponding to the one or more BWPs respectively.

The operation band may include a plurality of BWPs, each having a corresponding BWP index. Each BWP may include one or more physical resource blocks (PRBs) consecutive in the frequency domain, and can be defined by a starting position and a length (or a duration). The starting position represents an index of the starting PRB (normally the PRB with the lowest frequency) in the BWP. The length represents the number of PRBs in the BWP. It is possible that two different BWPs may at least partially overlap with each other.

When the IAB node (e.g., IAB node 120C in FIG. 1) receives the DCI signaling from the parent node (e.g., IAB node 120D in FIG. 1) which configures the one or more BWPs for the parent link (e.g., link 180D in FIG. 1), it performs a BWP switch on the parent link to switch to the configured BWPs. In addition, based on the received configuration of BWP(s) for the parent link, the IAB node can derive PRB(s) which can be used by a link (e.g., link 180E in FIG. 1) between the IAB node and a child node (e.g., IAB node 120B in FIG. 1) of the IAB node, i.e., a child link of the IAB node. Then, the IAB node may configure another set of frequency domain resources for the child link via DCI signaling (e.g., signaling for a downlink assignment or uplink grant) to the child node. For example, the another set of frequency domain resources may correspond to one or more BWPs consisting of PRB(s) not included in the BWP(s) configured for the parent link. In this way, implicit FDM between the parent link and the child link can be implemented.

According some embodiments of the present disclosure, to implement the implicit FDM, the IAB node (e.g., IAB node 120C in FIG. 1) needs to signal the downlink assignment or uplink grant for the child link (e.g., link 180E in FIG. 1) to the child node (e.g., IAB node 120B in FIG. 1) after receiving the corresponding downlink assignment or uplink grant for the parent link (e.g., link 180D in FIG. 1) from the parent node (e.g., IAB node 120D in FIG. 1). Otherwise, the IAB node should report the configuration information for the child link to the parent node, so that the parent node configures frequency domain resources for the parent link. The configuration information for the child link can be reported to the parent node through a physical uplink control channel (PUCCH) or physical uplink shared channel (PUSCH).

The implicit FDM between a parent link and a child link of an IAB node may result in a large scheduling delay, and only can configure dynamic frequency domain resources, which are not applicable to periodic messages.

Some embodiments of the present disclosure implement explicit FDM between a parent link and a child link of an IAB node, which can configure both semi-static frequency domain resources and dynamic frequency domain resources for the parent link and the child link. In these embodiments of the present disclosure, a parent node of an IAB node may explicitly indicate at least one of semi-static and dynamic frequency domain resources for at least one the IAB node's parent link and child link to the IAB node.

According to some embodiments of the present disclosure, a parent node of an IAB node may configure a semi-static frequency domain resource for a parent link between the parent node and the IAB node. The parent node may also configure a semi-static frequency domain resource for a child link between the IAB node and a child node of the IAB node. There is no overlap between the semi-static frequency domain resource for the parent link and the semi-static frequency domain resource for the child link. These semi-static frequency domain resources can serve as the default BWP(s) for the parent link and the child link respectively. They can also be used for at least one of synchronization signal block (SSB) configuration, random access channel (RACH) resource configuration, periodic channel state information (CSI)-reference signal (RS), and sounding reference signal (SRS).

The semi-static frequency domain resources may include uplink and downlink frequency domain resources. In a time division duplexing (TDD) mode (also referred to as "unpaired band"), the downlink frequency domain resource for the parent link is the same as the uplink frequency domain resource for the parent link, and the downlink frequency domain resource for the child link is the same as the uplink frequency domain resource for the child link. In a frequency division duplexing (FDD) mode (also referred to as "paired band"), four different frequency domain resources may be configured: a downlink frequency domain resource for the parent link, an uplink frequency domain resource for the parent link, a downlink frequency domain resource for the child link, and an uplink frequency domain resource for the child link.

According to some embodiments of the present disclosure, the signaling transmitted by a parent node of an IAB node to configure semi-static frequency domain resources for a parent link and a child link of the IAB node is carried in a radio resource control (RRC) signaling or a medium access control (MAC) control element (CE) signaling. The parent node may transmit at least one of three kinds of semi-static signaling to the IAB node to configure semi-static frequency domain resources for the parent link and the child link of the IAB node: a first semi-static signaling used to configure or indicate at least one semi-static frequency domain resource for the child link, a second semi-static signaling used to configure or indicate at least one semi-static frequency domain resource for the parent link, and a third semi-static signaling used to configure or indicate at least one semi-static frequency domain resource that cannot be used by the child link, e.g., for purpose of cross interference mitigation. The first semi-static signaling and the third semi-static signaling are configured for the IAB node's DU part (e.g., DU 151B in FIG. 1B) while the second semi-static signaling is configured for the IAB node's MT part (e.g., MT 152B in FIG. 1B). When the at least one semi-static frequency domain resource that cannot be used by the child link is the same as at least one semi-static frequency domain resource configured for the parent link, the third semi-static signaling is unnecessary and the at least one semi-static frequency domain resource that cannot be used by the child link can be determined implicitly based on the second semi-static signaling. The three kinds of semi-static signaling can be transmitted in a single signaling or transmitted separately. In an embodiment of the present disclosure, the semi-static signaling may include at least one BWP index corresponding to the semi-static frequency domain resource(s) configured by the semi-static signaling.

According to some embodiments of the present disclosure, a parent node of an IAB node may configure a dynamic frequency domain resource for a parent link between the parent node and the IAB node. The parent node may also configure a dynamic frequency domain resource for a child link between the IAB node and a child node of the IAB node. There is no overlap between the dynamic frequency domain resource for the parent link and the dynamic frequency domain resource for the child link. Similar to the semi-static frequency domain resources, the dynamic frequency domain resources may also include uplink and downlink frequency domain resources.

According to some embodiments of the present disclosure, the signaling transmitted by a parent node of an IAB node to configure dynamic frequency domain resources for a parent link and a child link of the IAB node is carried in a group common DCI signaling. The parent node may transmit at least one of two kinds of dynamic signaling to the IAB node to configure dynamic frequency domain resources for the parent link and the child link of the IAB node: a first dynamic signaling used to configure or indicate at least one dynamic frequency domain resource for the child link, and a second dynamic signaling used to configure or indicate at least one dynamic frequency domain resource for the parent link. The first dynamic signaling is configured for the IAB node's DU part (e.g., DU 151B in FIG. 1B) while the second dynamic signaling is configured for the IAB node's MT part (e.g., MT 152B in FIG. 1B). There is no need to transmit a signaling used to configure or indicate at least one dynamic frequency domain resource that cannot be used by the child link, because it can be determined based on the second dynamic signaling. In an embodiment of the present disclosure, the first dynamic signaling is similar to DCI 2_5 format, and the second dynamic signaling is similar to DCI 2_0 format. The two kinds of dynamic signaling can be transmitted by separate DCI formats with different radio network temporary identity (RNTI) values or transmitted in different payload position of a single DCI format. In an embodiment of the present disclosure, the dynamic signaling may include at least one BWP index corresponding to the dynamic frequency domain resource(s) configured by the dynamic signaling.

According to some embodiments of the present disclosure, the parent node may transmit to the IAB node both a semi-static signaling and a dynamic signaling for configuring frequency domain resources. There are mainly three options that can be adopted to avoid contradiction between the semi-static resource configuration and the dynamic resource configuration:

Option 1: For a same frequency domain resource, the semi-static signaling and the dynamic signaling always configure it for the same link. That is, the configuration of a frequency domain resource indicated by the dynamic signaling always does not contradict the configuration of the same frequency domain resource indicated by the semi-static signaling.

Option 2: The frequency domain resource(s) indicated by the dynamic signaling exclude all frequency domain resources that are indicated by the semi-static signaling. Additionally or alternatively, the frequency domain resource(s) indicated by the dynamic signaling may exclude all frequency domain resources that are indicated by a default configuration (e.g., pre-configuration by a network).

Option 3: The dynamic signaling has a higher priority than the semi-static signaling if the dynamic signaling and the semi-static signaling configure a same frequency domain resource for different links. That is, the IAB node determines for which link the frequency domain resource is configured according to the dynamic signaling when the configuration of the frequency domain resource indicated by the dynamic signaling contradicts the configuration of the same frequency domain resource indicated by the semi-static signaling. Alternatively, the dynamic signaling has a lower priority than the semi-static signaling if the dynamic signaling and the semi-static signaling configure a same frequency domain resource for different links. That is, the IAB node determines for which link the frequency domain resource is configured according to the semi-static signaling when the configuration of the frequency domain resource indicated by the dynamic signaling contradicts the configuration of the same frequency domain resource indicated by the semi-static signaling. Alternatively, the IAB node determines for which link the frequency domain resource is configured according to a default configuration (e.g., pre-configuration by a network) when the configuration of the frequency domain resource indicated by the dynamic signaling contradicts the configuration of the same frequency domain resource indicated by the semi-static signaling.

Figure 2:
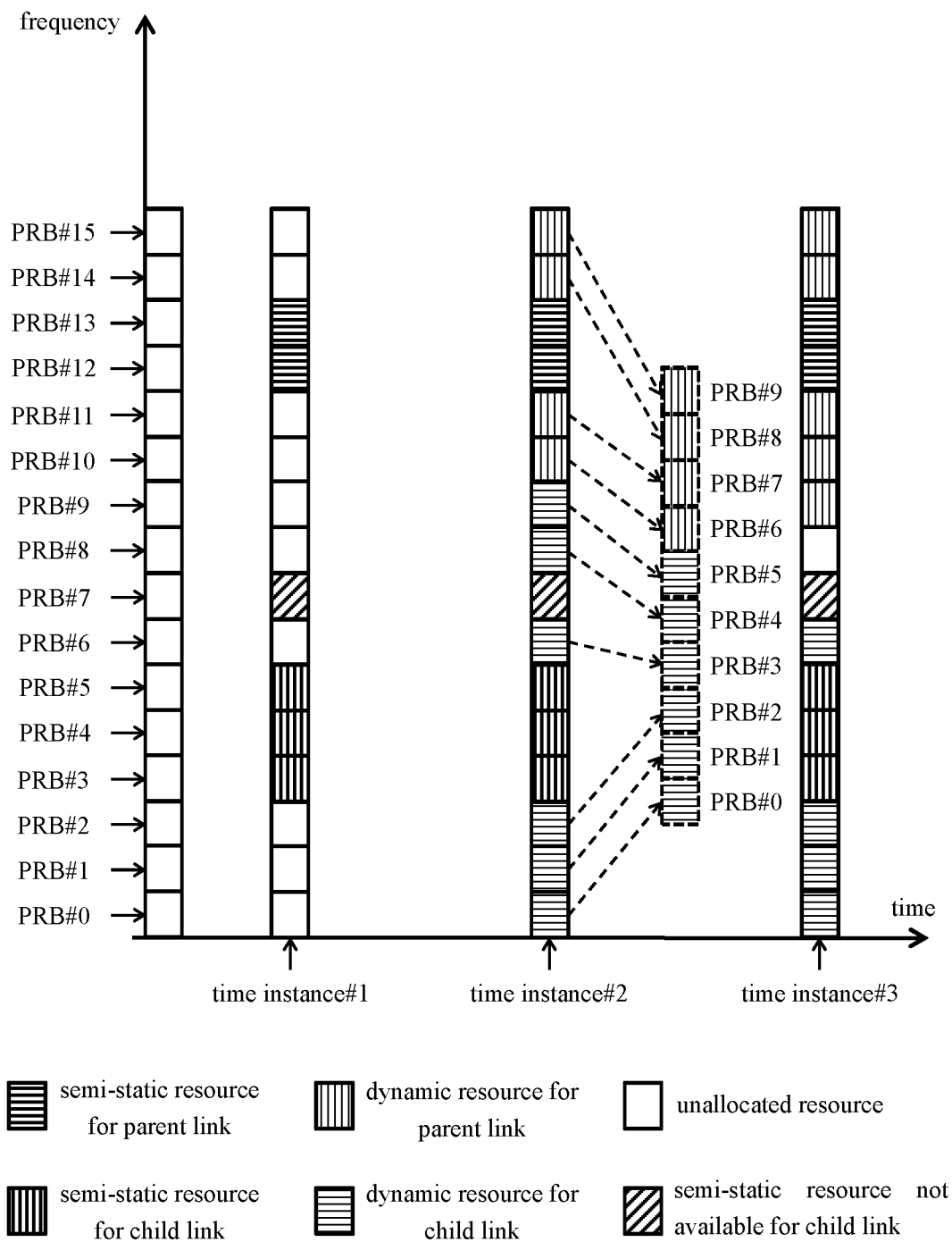
FIG. 2 illustrates an example of semi-static signaling and dynamic signaling for configuring frequency domain resources for a parent link and a child link of an IAB node according to some embodiments of the present disclosure.

FIG. 2 illustrates an example of semi-static signaling and dynamic signaling for configuring frequency domain resources for a parent link and a child link of an IAB node according to some embodiments of the present disclosure.

In the example of FIG. 2, the operation band of the IAB node includes sixteen PRBs (PRB #0 to PRB #15), and the IAB node operates in a TDD mode, i.e., the downlink frequency domain resource for the parent link is the same as the uplink frequency domain resource for the parent link, and the downlink frequency domain resource for the child link is the same as the uplink frequency domain resource for the child link. It is contemplated that similar methods are also applicable to any other operation band including more or less PRBs, and also applicable to a FDD mode.

At time instance #1, semi-static frequency domain resources are configured, which is applicable at least until time instance #3. For example, a first semi-static signaling may configure or indicate PRB #3, PRB #4, and PRB #5 for the child link. These semi-static frequency domain resources for the child link can be indicated in the first semi-static signaling as a BWP with a starting position of PRB #3 and a length of 3. A second semi-static signaling may configure or indicate PRB #12 and PRB #13 for the parent link. These semi-static frequency domain resources for the parent link can be indicated in the second semi-static signaling as a BWP with a starting position of PRB #12 and a length of 2. A third semi-static signaling may configure or indicate PRB #7 as not available for the child link, i.e., the semi-static frequency domain resource cannot be used by the child link. The third semi-static signaling may also configure or indicate PRB #12 and PRB #13 as not available for the child link due to being used for the parent link. These semi-static frequency domain resources can be indicated in the third semi-static signaling as two BWPs: a first BWP with a starting position of PRB #7 and a length of 1, and a second BWP with a starting position of PRB #12 and a length of 2 (i.e., the BWP configured for the parent link). According to some embodiments of the present disclosure, the third semi-static signaling does not need to indicate the second BWP, because the IAB node can determine that the second BWP is not available for the child link based on the second semi-static signaling.

At time instance #2, dynamic frequency domain resources are configured. For example, a first dynamic signaling may configure or indicate PRB #0, PRB #1, PRB #2, PRB #6, PRB #8, and PRB #9 for the child link, and a second dynamic signaling may configure or indicate PRB #10, PRB #11, PRB #14, and PRB #15 for the parent link.

When option 1 is adopted, the dynamic frequency domain resources for the child link indicated in the first dynamic signaling can also include those indicated by the semi-dynamic signaling. That is, the dynamic frequency domain resources for the child link can be indicated in the first dynamic signaling as two BWPs: a first BWP with a starting position of PRB #0 and a length of 7 (that is, including PRB #3 to PRB #5 in addition to PRB #0, PRB #1, PRB #2, PRB #6), and a second BWP with a starting position of PRB #8 and a length of 2. The dynamic frequency domain resources for the parent link can be indicated in the second dynamic signaling as a BWP with a starting position of PRB #10 and a length of 6 (that is, including PRB #12 and PRB #13 in addition to PRB #10, PRB #11, PRB #14, and PRB #15).

When option 2 is adopted, PRB #3, PRB #4, PRB #5, PRB #7, PRB #12, and PRB #13 which are indicated by the semi-static signaling are excluded, and the remaining PRBs are re-indexed as PRB #0 to PRB #9 (denoted as the dotted blocks). The dotted blocks are only for illustration of the re-indexing and do not represent the frequency ranges of the re-indexed PRBs. The frequency ranges of the PRBs do not change after re-indexing. Then, the dynamic frequency domain resources for the child link can be indicated in the first dynamic signaling as a BWP with a starting position of PRB #0 and a length of 6, and the dynamic frequency domain resources for the parent link can be indicated in the second dynamic signaling as a BWP with a starting position of PRB #6 and a length of 4.

When option 3 is adopted and the dynamic signaling has a lower priority than the semi-static signaling, the dynamic frequency domain resources for the child link (PRB #0, PRB #1, PRB #2, PRB #6, PRB #8, and PRB #9) can be indicated in the first dynamic signaling as a BWP with a starting position of PRB #0 and a length of 10. Although the first dynamic signaling indicates PRB #7 for the child link, the configuration of PRB #7 is determined according to the third semi-static signaling, i.e., PRB #7 is not available for the child link. The dynamic frequency domain resources for the parent link (PRB #10, PRB #11, PRB #14, and PRB #15) can be indicated in the second dynamic signaling as a BWP with a starting position of PRB #10 and a length of 6.

At time instance #3, dynamic frequency domain resources are configured differently from that at time instance #2. For example, a first dynamic signaling may configure or indicate PRB #0, PRB #1, PRB #2, and PRB #6 for the child link, and a second dynamic signaling may configure or indicate PRB #9, PRB #10, PRB #11, PRB #14, and PRB #15 for the parent link. The dynamic frequency domain resources can be indicated as BWPs in the dynamic signaling dependent on different options in a manner similar to that described above with reference to time instance #2.

FDM between a parent link and a child link of an IAB node enables simultaneous transmission (Tx) or reception (Rx) at the IAB node. For example, the IAB node may perform uplink (UL) transmission on the parent link and downlink (DL) transmission on the child link simultaneously, or perform downlink reception on the parent link and uplink reception on the child link simultaneously.

Figure 3:
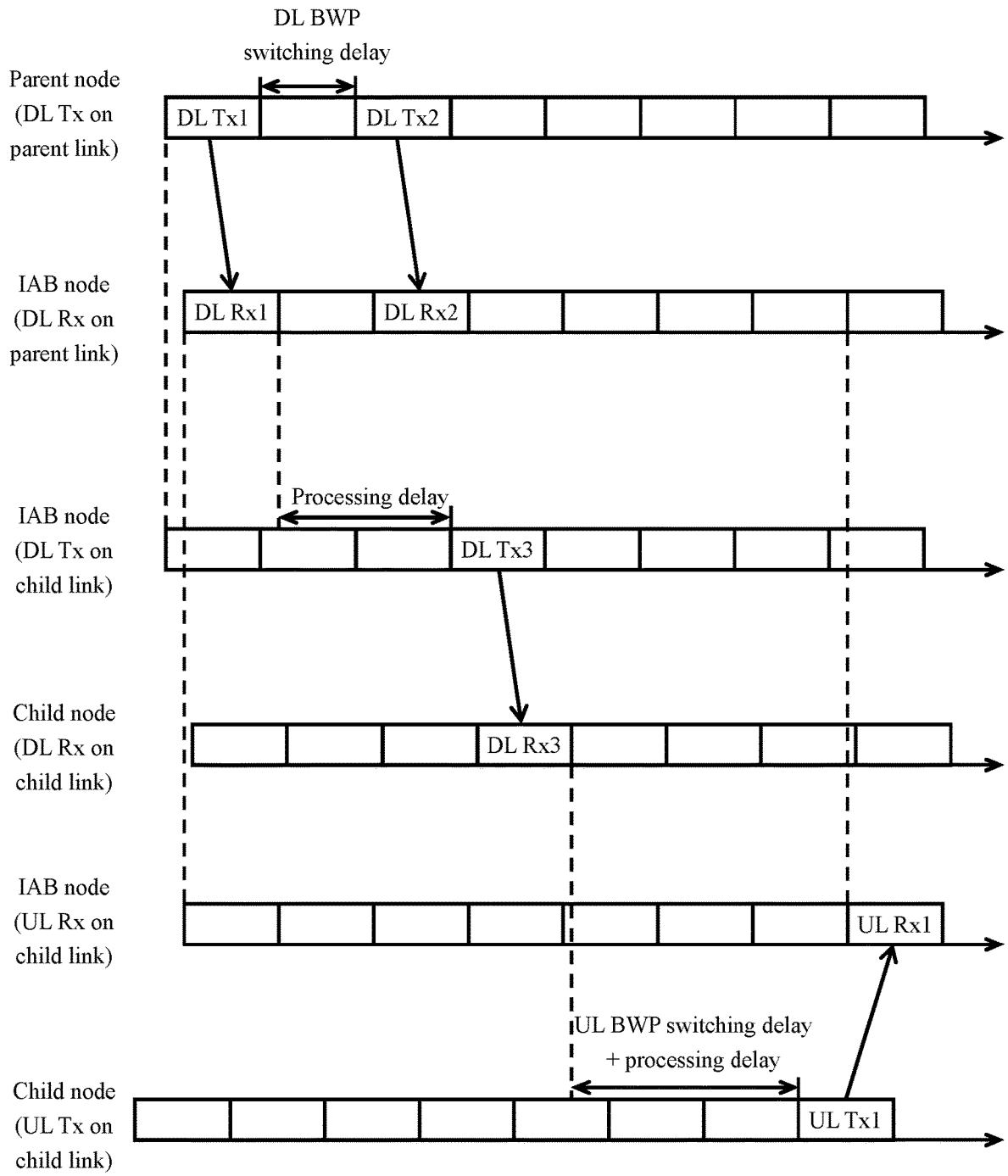
FIG. 3 illustrates an example of simultaneous receptions at an IAB node according to some embodiments of the present disclosure.

FIG. 3 illustrates an example of simultaneous receptions at an IAB node according to some embodiments of the present disclosure.

In the example of FIG. 3, a patent node of the IAB node performs DL Tx1 (e.g., in DCI 2_0 format or DCI 2_6 format) on a parent link between the parent node and the IAB node to configure dynamic frequency domain resources (e.g., BWP) for the parent link and a child link between the IAB node and a child node of the IAB node, and the IAB node performs corresponding DL Rx1 after a transmitting delay. The parent node then performs a DL BWP switch and a new DL BWP can be considered available after a DL BWP switching delay, which is 1 slot in this example. That is, the new DL BWP can be applied for the parent node from DL Tx2 on the downlink of the parent link. Correspondingly, the new DL BWP can be applied for the IAB node from DL Rx2 on the downlink of the parent link.

After the IAB node receives a dynamic BWP configuration from the parent node (i.e., DL Rx1), it performs DL Tx3 after a processing delay to indicate dynamic BWP configuration for the child link, and the child node performs corresponding DL Rx3 after a transmitting delay. After the child node receives dynamic BWP configuration from the IAB node (i.e., DL Rx3), it performs a UL BWP switch and a new BWP can be considered available after a UL BWP switching delay plus a processing delay. The processing delay may include a UL processing delay only when the child link is an access link, i.e., the child node is a UE. When the child node is another IAB node, it needs to transmit another dynamic BMP configuration to its child node and thus a DL processing delay is necessary. That is, in such a case, the processing delay may include both a UL processing delay and a DL processing delay. A new UL BWP can be applied for the child node from UL Tx1 on the uplink of the child link. Correspondingly, the new UL BWP can be applied for the IAB node from UL Rx1 on the uplink of the child link.

As shown in FIG. 3, for simultaneous receptions at the IAB node, the time delay from a BWP switch indication (e.g., DL Tx1) to application of the new DL BWP on the parent link is different from the time delay from the BWP switch indication (e.g., DL Tx1) to application of the new UL BWP on the child link. Likewise, for simultaneous transmissions at the IAB node, the time delay from a BWP switch indication to application of a new UL BWP on the parent link is also different from the time delay from the BWP switch indication to application of a new DL BWP on the child link. From a signaling perspective, it is preferable to explicitly signal the time delays to the IAB node to indicate when a new BWP is applied.

According to some embodiments of the present disclosure, a parent node of an IAB node may transmit an offset between the reception of a dynamic signaling for configuring dynamic frequency domain resource(s) for one of a parent link and a child link of the IAB node and the application of the dynamic configuration. The offset can be transmitted in an RRC signaling, a MAC CE signaling, or a DCI signaling.

According to some embodiments of the present disclosure, a parent node of an IAB node may transmit the dynamic signaling for configuring dynamic frequency domain resource(s) periodically. The transmission periodicity of the dynamic signaling can be configured by a physical downlink control channel (PDCCH) monitoring periodicity in a corresponding search space.

According to some embodiments of the present disclosure, a parent node of an IAB node may transmit a duration during which a dynamic signaling for configuring dynamic frequency domain resource(s) for one of a parent link and a child link of the IAB node is applied. The duration can be transmitted in an RRC signaling, a MAC CE signaling, or a DCI signaling.

According to some embodiments of the present disclosure, there may be semi-static frequency domain resources configured periodically in the time domain. The dynamic frequency domain resources can be configured for slots excluding those slots for which semi-static frequency domain resources are configured. In some embodiments of the present disclosure, instead of signaling a duration which a dynamic signaling for configuring dynamic frequency domain resource(s) for one of a parent link and a child link of the IAB node is applied, the parent node may explicitly signal the time domain resource(s) on which the dynamic signaling is applied. For example, the parent node may signal slot index(es) in a periodicity where the dynamic signaling is applied.

According to some embodiments of the present disclosure, in the time duration between the transmission or reception of a dynamic frequency domain resource indication and the application of the dynamic frequency domain resource, default or semi-static frequency domain resource(s) can be used. For any other time domain resources on which dynamic frequency domain resource(s) is not configured or indicated, default or semi-static frequency domain resource(s) can be used. For example, the semi-static frequency domain resource(s) configured in time instance #1 in FIG. 2 can be replaced by frequency domain resource(s) provided by a default configuration.

According to some embodiments of the present disclosure, for a specific time domain resource, two dynamic frequency domain resource indications for the same link will not indicate two different frequency domain resources (e.g., BWPs with different BWP indexes), respectively. That is, two dynamic frequency domain resource indications will not be applied on overlapped time domain resources. According to other embodiments of the present disclosure, when two dynamic frequency domain resource indications contradict, e.g., they configure the same dynamic frequency domain resource for different links, the dynamic frequency domain resource will be configured according to the latest received dynamic frequency domain resource indication, or alternatively according to a default configuration or semi-static frequency domain resource indication.

Figure 4:
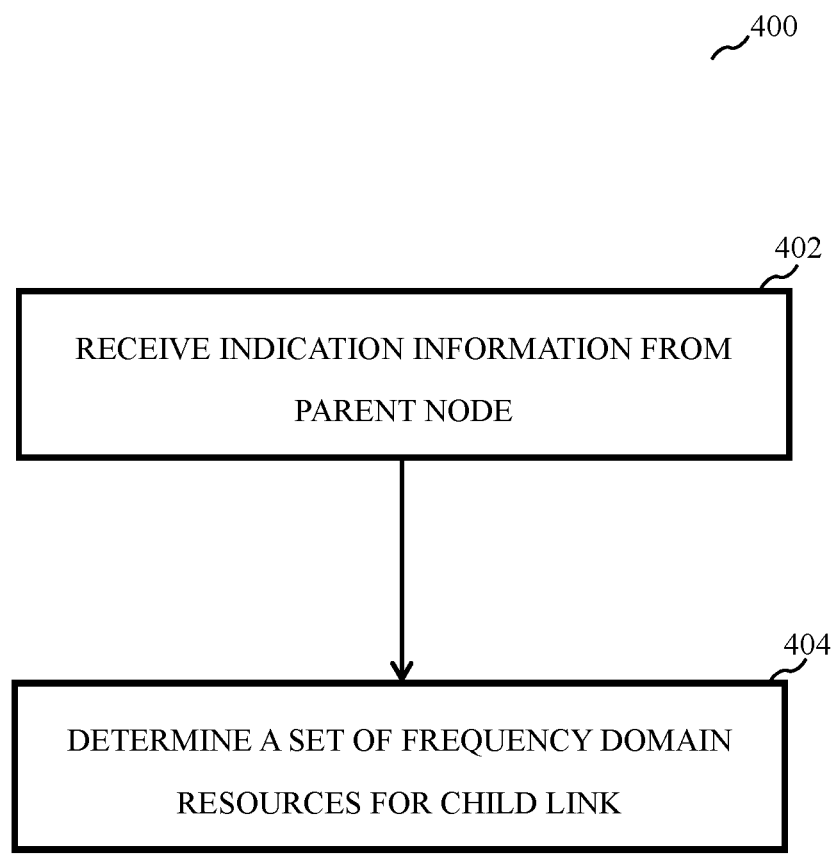
FIG. 4 illustrates an exemplary flow chart of a method for dynamic FDM between a parent link and a child link in an IAB network according to some embodiments of the present disclosure.

FIG. 4 illustrates an exemplary flow chart of a method 400 for dynamic FDM between a parent link and a child link in an IAB network according to some embodiments of the present disclosure. Although described with respect to an IAB node, it should be understood that other devices may be configured to perform a method similar to that of FIG. 4.

As shown in FIG. 4, in step 402, an IAB node may receive indication information from a parent node of the IAB node, wherein the indication information indicates at least one frequency domain resource of an operating band associated with one of a parent link between the IAB node and the parent node and a child link between the IAB node and a child node of the IAB node. In step 404, the IAB node may determine a set of frequency domain resources for the child link from the operating band at least based on the indication information.

According to some embodiments of the present disclosure, the parent node may include a parent IAB node or an IAB donor, and the child node may include a child IAB node or a UE. The operating band may include at least one of an uplink operating band or a downlink operating band. The indication information may include at least one BWP index corresponding to the at least one frequency domain resource. In some embodiments of the present disclosure, the indication information indicates the at least one frequency domain resource for the child link. In other embodiments of the present disclosure, the indication information indicates the at least one frequency domain resource for the parent link.

According to some embodiments of the present disclosure, the indication information is received in an RRC signaling or a MAC CE signaling. That is, the indication information is received in a semi-static signaling.

According to other embodiments of the present disclosure, the indication information is received in group common DCI signaling. That is, the indication information is a dynamic signaling. In some embodiments of the present disclosure, the IAB node may receive an offset between reception of the indication information and application of the indication information. In some embodiments of the present disclosure, the IAB node may receive a duration during which the indication information of the at least one frequency domain resource is applied.

According to other embodiments of the present disclosure, the set of frequency domain resources for the child link exclude all frequency domain resources that are indicated for the parent link by at least one of: an indication received in an RRC signaling or a MAC CE signaling (i.e., a semi-static signaling for configuring semi-static frequency domain resource(s)); or a default configuration. In some embodiments of the present disclosure, the IAB node may determine the set of frequency domain resources for the child link based on the indication information and a predefined set of frequency domain resources.

Figure 5:
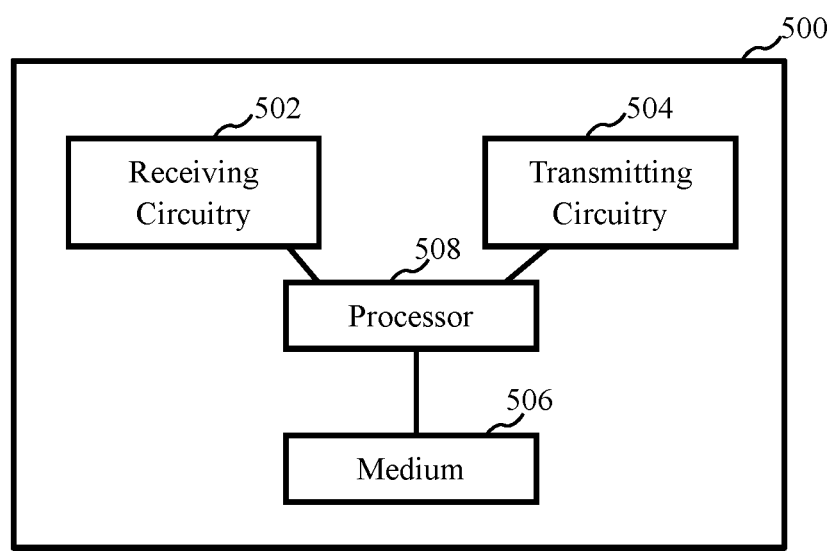
FIG. 5 illustrates an exemplary block diagram of an apparatus according to some embodiments of the present disclosure.

FIG. 5 illustrates an exemplary block diagram of an apparatus 500 according to an embodiment of the present disclosure. In some embodiments of the present disclosure, the apparatus 500 may be an IAB node or other devices having similar functionalities, which can at least perform the method illustrated in FIG. 4.

As shown in FIG. 5, the apparatus 500 may include at least one receiving circuitry 502, at least one transmitting circuitry 504, at least one non-transitory computer-readable medium 506, and at least one processor 508 coupled to the at least one receiving circuitry 502, the at least one transmitting circuitry 504, the at least one non-transitory computer-readable medium 506. Although FIG. 5 shows that the at least one receiving circuitry 502, the at least one transmitting circuitry 504, the at least one non-transitory computer-readable medium 506 are directly coupled with the at least one processor 508, it should be understand that all the components in apparatus 500 can be coupled to a data bus so as to be connected and communicate with each other.

Although in FIG. 5, elements such as receiving circuitry 502, transmitting circuitry 504, non-transitory computer-readable medium 506, and processor 508 are described in the singular, the plural is contemplated unless limitation to the singular is explicitly stated. In some embodiments of the present disclosure, the at least one receiving circuitry 502 and the at least one transmitting circuitry 504 are combined into a single device, such as a transceiver. In certain embodiments of the present disclosure, the apparatus 500 may further include an input device, a memory, and/or other components.

In some embodiments of the present disclosure, the at least one non-transitory computer-readable medium 506 may have stored thereon computer-executable instructions which are programmed to cause the at least one processor 508 to implement the steps of the methods, for example as described in view of FIG. 4, with the at least one receiving circuitry 502 and the at least one transmitting circuitry 504. For example, when executed, the instructions may cause the at least one processor 508 to receive, with the at least one receiving circuitry 502, indication information from a parent node of the IAB node, wherein the indication information indicates at least one frequency domain resource of an operating band associated with one of a parent link between the IAB node and the parent node and a child link between the IAB node and a child node of the IAB node. The instructions may further cause the at least one processor 508 to determine a set of frequency domain resources for the child link from the operating band at least based on the indication information.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by an integrated access and backhaul (IAB) node, comprising:
    receiving indication information from a parent node of the IAB node via group common downlink control information (DCI) signaling, the indication information indicating at least one frequency domain resource of an operating band associated with one of a parent link between the IAB node and the parent node or a child link between the IAB node and a child node of the IAB node;
    receiving, via radio resource control (RRC) signaling, a duration during which the indication information of the at least one frequency domain resource is applied; and
    determining a set of frequency domain resources for the child link from the operating band at least based on the indication information.

2. The method of claim 1, wherein the parent node comprises a parent IAB node or an IAB donor, and the child node comprises a child IAB node or a user equipment.

3. The method of claim 1, wherein the operating band comprises at least one of an uplink operating band or a downlink operating band.

4. The method of claim 1, wherein the indication information comprises at least one bandwidth part (BWP) index corresponding to the at least one frequency domain resource.

5. The method of claim 1, wherein the indication information indicates at least one of the at least one frequency domain resource for the child link or the at least one frequency domain resource for the parent link.

6. The method of claim 1, further comprising receiving an offset between reception of the indication information and application of the indication information.

7. The method of claim 6, wherein the offset is received via RRC signaling, medium access control (MAC) control element (CE) signaling, or downlink control information (DCI) signaling.

8. The method of claim 1, wherein the at least one frequency domain resource excludes all frequency domain resources that are indicated by at least one of:
    an indication received via radio resource control (RRC) signaling or medium access control (MAC) control element (CE) signaling; or
    a default configuration.

9. The method of claim 1, wherein:
    the indication information indicates a frequency domain resource for one of the parent link or the child link that is indicated for the other of the parent link and the child link by a previously received indication via RRC signaling or medium access control (MAC) control element (CE) signaling; and
    determining the set of frequency domain resources for the child link comprises determining whether to include the frequency domain resource in the set of frequency domain resources according to at least one of the previously received indication, the indication information, or a default configuration.

10. The method of claim 1, wherein determining the set of frequency domain resources for the child link comprises determining whether to include a frequency domain resource in the set of frequency domain resources according to at least one of a second indication that indicates at least one second frequency domain resource of the operating band, an indication received RRC signaling or medium access control (MAC) control element (CE) signaling, a default configuration, or the indication information and a predefined set of frequency domain resources.

11. An integrated access and backhaul IAB) node for wireless communication, comprising:
    at least one memory; and
    at least one processor coupled with the at least one memory and operable to cause the IAB node to:
        receive indication information from a parent node of the IAB node via group common downlink control information (DCI) signaling, the indication information indicating at least one frequency domain resource of an operating band associated with one of a parent link between the IAB node and the parent node or a child link between the IAB node and a child node of the IAB node;
        receive, via radio resource control (RRC) signaling, a duration during which the indication information of the at least one frequency domain resource is applied; and
        determine a set of frequency domain resources for the child link from the operating band at least based on the indication information.

12. The IAB node of claim 11, wherein the parent node comprises a parent IAB node or an IAB donor, and the child node comprises a child IAB node or a user equipment.

13. The LAB node of claim 11, wherein the operating band comprises at least one of an uplink operating band or a downlink operating band.

14. The IAB node of claim 11, wherein the indication information indicates at least one of the at least one frequency domain resource for the child link or the at least one frequency domain resource for the parent link.

15. A parent node of an integrated access and backhaul (IAB) node for wireless communication, comprising:
   at least one memory; and
   at least one processor coupled with the at least one memory and operable to cause the parent node to:
      transmit indication information to the LAB node via group common downlink control information (DCI) signaling, the indication information indicating at least one frequency domain resource of an operating band associated with one of a parent link between the IAB node and the parent node or a child link between the IAB node and a child node of the IAB node;
      transmit, via radio resource control (RRC) signaling, a duration during which the indication information of the at least one frequency domain resource is applied; and
      determine a set of frequency domain resources for the child link from the operating band at least based on the indication information.

16. A method performed by a parent node of an integrated access and backhaul (IAB) node, the method comprising:
   transmitting indication information to the IAB node via group common downlink control information (DCI) signaling, the indication information indicating at least one frequency domain resource of an operating band associated with one of a parent link between the LAB node and the parent node or a child link between the IAB node and a child node of the IAB node;
   transmitting, via radio resource control (RRC) signaling, a duration during which the indication information of the at least one frequency domain resource is applied; and
   determining a set of frequency domain resources for the child link from the operating band at least based on the indication information.

17. The parent node of claim 15, wherein the parent node comprises a parent IAB node or an IAB donor, and the child node comprises a child IAB node or a user equipment.

18. The parent node of claim 15, wherein the operating band comprises at least one of an uplink operating band or a downlink operating band.

19. The parent node of claim 15, wherein the indication information comprises at least one bandwidth part (BWP) index corresponding to the at least one frequency domain resource.

20. The parent node of claim 15, wherein the indication information indicates at least one of the at least one frequency domain resource for the child link or the at least one frequency domain resource for the parent link.

* * * * *